United States Patent [19]
Heyring et al.

[11] Patent Number: 6,010,139
[45] Date of Patent: Jan. 4, 2000

[54] VEHICLE SUSPENSION WITH INDEPENDENT PITCH AND ROLL CONTROL

[75] Inventors: Christopher B. Heyring, Eagle Bay; Reginald I. Thompson, Duncraig, both of Australia

[73] Assignee: Kinetic, Limited, Dunsborough, Australia

[21] Appl. No.: 08/700,508

[22] PCT Filed: Feb. 27, 1996

[86] PCT No.: PCT/AU95/00096

§ 371 Date: Jan. 7, 1997

§ 102(e) Date: Jan. 7, 1997

[87] PCT Pub. No.: WO95/23076

PCT Pub. Date: Aug. 31, 1995

[30] Foreign Application Priority Data

Feb. 25, 1994 [AU] Australia ............................. PM 4092
May 30, 1994 [AU] Australia ............................. PM 5962
Oct. 26, 1994 [WO] WIPO ..................... PCT/AU94/00646

[51] Int. Cl.[7] ............................. B60G 11/00; B60G 7/00
[52] U.S. Cl. ........................ 280/124.104; 280/124.106; 280/124.159; 280/124.161
[58] Field of Search ................ 280/124.104, 124.106, 280/124.159, 124.161

[56] References Cited

U.S. PATENT DOCUMENTS

| | | |
|---|---|---|
| 3,024,037 | 3/1962 | Fiala et al. . |
| 3,032,349 | 5/1962 | Fiala et al. . |
| 4,270,771 | 6/1981 | Fujii ............................. 280/5.514 |
| 4,973,080 | 11/1990 | Ikemoto et al. ............ 280/5.502 |
| 5,040,823 | 8/1991 | Lund ........................... 280/5.502 |
| 5,447,332 | 9/1995 | Heyring ........................ 280/6.159 |
| 5,480,188 | 1/1996 | Heyring ..................... 280/124.104 |
| 5,562,305 | 10/1996 | Heyring ....................... 280/5.507 |

FOREIGN PATENT DOCUMENTS

| | | |
|---|---|---|
| 0035330 | 9/1981 | European Pat. Off. . |
| 820194 | 9/1959 | Germany . |
| 844146 | 8/1960 | Germany . |
| 3426734-A1 | 8/1995 | Germany . |
| WO9301948 | 2/1993 | WIPO . |
| WO9319945 | 10/1993 | WIPO . |

OTHER PUBLICATIONS

Patent Abstract of Japan, Publication Number JP 01 078 912(A); published March 24, 1989.
Patent Abstract of Japan, Publication Number JP 02 136 319(A); published May 24, 1990.

*Primary Examiner*—Michael J. Carone
*Assistant Examiner*—Theresa M. Wesson
*Attorney, Agent, or Firm*—Birch, Stewart, Kolasch & Birch, LLP

[57] ABSTRACT

A vehicle hydropneumatic suspension comprising four double acting rams (1, 2, 3, 4) each between respective one of four spaced wheels at corners of the vehicle. First conduits (9, 11) connecting main chambers (1a, 2a) of front rams (1, 2) with diagonally opposite rear cylinder minor chambers (3b, 4b), respectively, and, second conduits (10, 12) connecting minor chambers (1b, 2b) with main chambers of diagonally opposite rams (3a, 4a), respectively. A load distribution unit (13) has two cylindrical chambers (13a, 13b) each separated by a piston into, respectively, chambers (14, 15) and (16, 17). Conduits (9a, 10a, 11a, 12a) connect respectively conduits (9, 10, 11, 12) to chambers (14, 16, 17, 15). The pistons are connected by a resilient means (20) to allow relative piston movement to provide for independent control of pitch and roll of the vehicle.

20 Claims, 11 Drawing Sheets

6,010,139

VEHICLE SUSPENSION WITH INDEPENDENT PITCH AND ROLL CONTROL

BACKGROUND OF THE INVENTION

Field of the Invention

This invention relates to improvements in the suspension system or a vehicle, and is specifically related to controlling the disposition of the vehicle body relative to the ground when the vehicle is subject to variations in the contour of the surface being traversed.

Description of the Background Art

In recent times, there has been a trend towards resilient sprung suspension systems incorporating variable damping and spring rates in an attempt to improve vehicle stability and reduce movement of the vehicle body relative to the surface being traversed.

A range of suspension systems known as 'active' and 'semi-active' suspensions for vehicles have been trialed including systems operating on the basis of compression and/or displacement of fluids, and such systems currently in use incorporate a pump, to maintain the working fluid at the required pressure and effect the high speed distribution thereof, and sophisticated control mechanisms to regulate the operation of the suspension system in accordance with sensed road and/or vehicle operating conditions. These known systems incorporating pumps and electronic control systems, which both usually operate continuously while the vehicle is in operation, are comparatively expensive to construct and maintain, and require a substantial energy input. They therefore are finding limited acceptability in the vehicle industry.

There is previously published an International Patent Application (International Publication Number WO 93/01948, International Application Number PCT/AU92/00362 and dated Feb. 4, 1993) which discloses a 'passive' hydropneumatic vehicular suspension system. This disclosed passive suspension system has many of the advantages of 'active' or 'semi-active' suspension systems, whilst avoiding the complexity and expense of such systems, thereby making it more acceptable to the automotive industry.

In the suspension system disclosed in said patent, a front wheel ram and the diagonally opposite rear wheel ram have the upper chamber of the front ram interconnected with the lower chamber of the rear ram and the lower chamber of the front ram interconnected to the upper chamber of the rear ram. Similarly the respective chambers of the other front ram and rear ram are likewise interconnected. There is thus provided two individual fluid circuits, each comprising a front ram and a diagonally opposite rear ram. Each of the conduits interconnecting the respective upper and lower chambers normally has at least one conventional pressure accumulator in communication therewith. The two circuits are interconnected to a pressure balancing device which is arranged to maintain a substantially equal pressure in the two circuits, as is described in detail in the previously referred to International Patent Application No. WO93/01948.

This prior proposed vehicle suspension system obviates the use of ordinary springs (eg. coils, leaf, or torsion bar springs) as well as conventional telescopic dampers (commonly referred to as shock absorbers) and roll or sway stabiliser bars.

Springing or resilience is provided by way of the gas filled accumulators with damper valves located in the mouths of the accumulators. Conventional vehicles fitted with accumulator springs are known to provide good comfort levels when traversing low amplitude ground surfaces at most speeds. However, accumulators gassed to provide a soft ride also tend to induce and exaggerate unwanted roll and pitch motions when used without roll or sway stabiliser bars. Most hydropneumatically suspended vehicles are therefore normally provided with roll or sway bars made of spring steel which mechanically and transversely interconnect the two wheels of each axle thereby limiting roll but not pitch movements.

In the suspension system described above, (Patent # WO 93/01948), excessive roll movements are resisted and controlled hydropneumatically without roll stabiliser bars and the amount of roll permitted is defined by a function of the ratio of the rams' cylindrical bore diameters (of the diagonally opposite rams) to the ram rod diameters, and with regard to their stroke lengths and with regard to the amount of gas within the various accumulators of the suspension system.

It is also to be noted that the type of wheel geometry and the location and design of various components may give some components a mechanical advantage over others thereby providing for example, an appropriate but different amount of roll stiffness at the front relative to the rear of the vehicle which to an extent defines whether the vehicles under or oversteers when cornering.

In conventional vehicles, roll forces are resisted by the roll or sway bars, i.e. transverse mounted, formed spring steel bars which must be deformed in torsion for any body roll to occur. Conversely, pitch motion in the longitudinal plane is normally only partially resisted by the design of the suspension geometry with spring resonances being avoided through the appropriate selection of front and rear spring and damper rates without the need for any direct acting mechanical equivalent of the roll bar. This is because the pitching actions in the longitudinal direction are less severe than the transverse rolling actions.

It has been found that the system previously disclosed provides adequate comfort, stability and relatively consistent wheel loading irrespective of relative wheel travel positions during many manoeuvres such as axle articulations and single wheel inputs, however, the magnitude of pitch and roll control is governed by the same components and the effective linear stiffness of each wheel in relation to the vehicle body in either pitch or roll is typically the same. In long wheel based vehicles this translates to stiff pitch characteristics in relation to roll. In short wheel based vehicles, pitch and roll stiffness become closer in magnitude. As most vehicles are considerably narrower than they are long, and due to other geometric effects it has been found that roll is more difficult to control than pitch as noted above. Indeed, when the suspension system is designed to adequately contain roll movement the pitch motions may be consequently over compensated for in the system. This may be further clarified as follows:

In order to contain high roll forces resulting from a high centre of gravity with respect to the relatively closely located rams (in the transverse direction), it is necessary to supply rams with a greater difference in rod and bore diameters. This therefore may automatically generate an unnecessary amount of pitch resistance or control in the longitudinal direction and this can lead to harshness of ride quality in some conditions. In particular it has been found that while body disturbance due to axle articulation movements and single wheel inputs is minimised, road surfaces that give rise to double wheel inputs on a single axle (such as 'speed humps') or sinusoidal road profiles can upset the previously disclosed suspension system. Typically this occurs when a vehicle's wheel base length approximates to half of the spacing of the humps disposed along the road surface. In order to traverse this kind of road surface smoothly (without excessive pitch motions being induced) both axles need to become independent in their motion, however the previously disclosed interrelated hydropneumatic system interprets these motions as high speed pitch movements and therefore attempts to resist them as though they were unwanted pitch motions. This type of high speed pitch resistance and over compensation manifests itself as an inappropriate pitch harshness which can become additionally uncomfortable when the vehicle moves over repeated bumps or dips causing increasingly exaggerated and inappropriate resonant responses.

SUMMARY OF THE INVENTION

It is therefore the object of this invention to provide a vehicle suspension system that will provide a more optimal relationship between the pitch and roll control of the vehicle.

A suspension system for a vehicle body having a plurality of wheels arranged in lateral and longitudinal spaced relation to support the vehicle body, said suspension system comprising individual ram means arranged between each wheel and the vehicle body, each ram means comprising a cylinder, piston and rod, a first and second balance means each having two chambers and force transfer means separating the chambers and displaceable in response to pressure conditions in the respective chambers, said force transfer means of each balance means being operably interconnected to transfer force therebetween to achieve a balanced state between the two transfer means;

the two chambers of each balance means including an inner chamber adjacent the interconnection and an opposing outer chamber;

the inner chambers of each balance means being in fluid communication respectively with the ram means on one end of the vehicle, and the outer chambers of each balance means being in fluid communication respectively with the ram means on the opposite end of the vehicle body, such that both chambers of the first balance means are in fluid communication with the ram means of one side of the vehicle body, both chambers of the second balance means being in fluid communication with the ram means on the opposing side of the vehicle body;

said interconnection between said force transfer means being adapted to transfer said force and allow relative movement between said force transfer means to provide additional resilience in a pitch direction of the vehicle body relative to a roll direction of the vehicle body.

The above described suspension system has the ability to generally maintain all wheels in tractive contact with the surface being traversed, particularly in situations of extreme surface irregularity as experienced in off-road operation. In addition, effective control of bounce pitch and roll of the vehicle is achieved by virtue of the fluid system controlling concurrently unidirectional movement of any two longitudinally adjacent or two laterally adjacent wheels relative to the vehicle. Maintenance of tractive contact of all wheels with the ground is achieved by the pressure conditions in the respective rams and the control of pitch and roll is by the pressure and movement of fluid between the rams and between the rams and the balance means.

Preferably the first and second balance means comprises first and second control chambers each divided into two cavities by respective movable walls. The two cavities of the first control chamber communicate respectively with the rams of the front and rear wheels on one side of the vehicle, and the cavities of the second control chamber communicate respectively with the fluid cylinders of the front and rear wheels on the opposite side of the vehicle. The force transfer means being arranged to interconnect said movable walls to transfer force therebetween to achieve a balanced state between the movable walls of the respective control chambers. Also, the interconnection between the force transfer means includes resilient means adapted to transfer said force and allow relative movement between the movable walls to achieve the balance between the net forces on the respective movable walls.

Conveniently said resilient means is arranged to be capable of transferring both tension and compressive forces. Preferably said resilient means is a metal or gas spring or a member of resilient material, such as a member of rubber or plastic.

Conveniently one or each movable wall can be in a form that is resiliently deformable so that the total volume of the control chamber occupied by the fluid can vary in response to the pressure in the two cavities of the respective chambers. The inclusion of a resilient means as part of each movable wall in addition to the resilient means interconnecting each movable wall allows for adjustment of both pitch and roll characteristics individually and independently.

The hydraulic rams may be of either the double or single acting type. In either arrangement, the chambers of the rams that are providing the support for the vehicle are connected to the balance means. If the balance means are to restrict the lateral roll of the vehicle whilst still permitting a degree of pitch resilience, then the chambers of the first balance means are in communication with the fluid chambers of the wheels on one longitudinal side of the vehicle and the chambers of the second balance means are in communication with the fluid cylinders of the wheels on the other side of the vehicle.

If the pitch motion of the vehicle is the dominant factor to be restricted, while still allowing some additional resilience about the roll axis, then the fluid cylinders of the front wheels are in communication with the first balance chamber and the fluid cylinders of the rear wheels in communication with the second balance chamber.

It will be appreciated that the provision of the resilient means interconnecting the movable walls in the respective control chambers enables at least a part of the movement of one wall to be absorbed by the resilient means therebetween so that a different degree of movement is transferred to the other movable wall. The resilient means can be either resiliently elongated or compressed and thus the difference in the extent of movement of the respective movable walls can be by way of an increase or decrease. The effect of this differential in the extent of movement of the respective movable walls is that a lesser degree of movement is transferred to the other wheels in response to a severe or rapid movement of both wheels on one axle of the vehicle in the same direction is that a lesser degree of movement is transferred to the other wheels, thus reducing or even reversing the aforementioned undesirable pitch control characteristics. When movable walls or members are constructed incorporating resilient means the other types of resilient means such as accumulator may be omitted.

A suspension system for a vehicle having a load support body, and a pair of front ground engaging wheels and a pair of rear ground engaging wheels connected to the body to support same and each wheel being displaceable relative to the body in a generally vertical direction, the suspension system comprising a double acting ram interconnected between each wheel and the body, each ram including first and second fluid filled chambers varying in volume in response to relative vertical movement between the respective wheel and the body. Each front wheel ram is connected to the diagonally opposite rear wheel ram by a respective pair of fluid communicating conduits a first one of said pair of conduits connecting the first chamber of the front wheel ram to the second chamber of rear wheel ram and the second one of said pair of conduits connecting the second chamber of the front wheel ram to the first chamber of the rear wheel ram. Each pair of conduits and the front and rear wheel rams interconnected thereby constituting a respective closed circuit whereby first and second closed circuits are formed, and a pressure distribution means interposed between the first and second closed circuits and adapted to substantially achieve pressure equilibrium between said closed circuits, said pressure distribution means comprising two primary pressure chambers, each divided into two secondary pressure chambers by piston means, the piston means of said primary chambers being operatively interconnected to transfer motion therebetween, and permit controlled independent motion to vary the relative position of the piston means in said primary pressure chamber, said controlled independent movement maintaining said substantial pressure equilibrium and permitting additional controlled pitch resilience.

BRIEF DESCRIPTION OF THE DRAWINGS

The invention will be more readily understood from the following description of a number of alternative arrangements of the vehicle suspension system with reference to the accompanying drawings.

In the drawings,

FIGS. 3 to 7B illustrate alternative forms of the load distribution unit that may be used in the suspension system shown in FIG. 1.

DETAILED DESCRIPTION OF THE PREFERRED EMBODIMENTS

Figure 1:
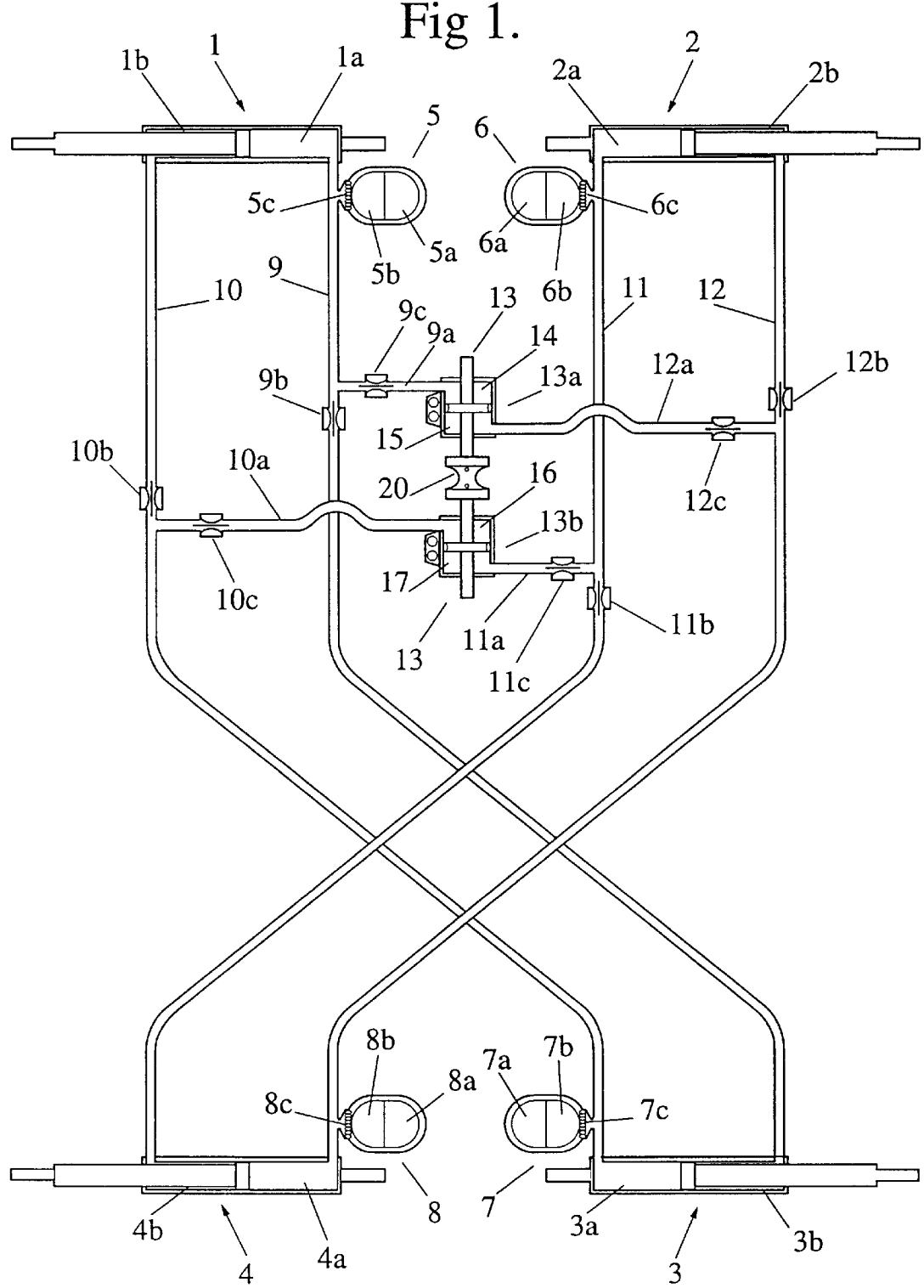
FIG. 1 is a diagrammatic representation of the suspension system.

Referring now to FIG. 1, four hydraulic cylinders or rams 1, 2, 3, and 4 are located in between the vehicular body/chassis (not shown) and the wheel units (not shown) so that as each wheel moves relatively to the chassis, the rams are caused to be contracted or extended.

As shown in FIG. 1, the ram is functionally related to the front left wheel while ram 2 is similarly associated with the front right wheel. Ram 3 is associated with the rear right hand side wheel while ram 4 is located between the rear left wheel and the chassis. The front of the vehicle is therefore represented towards the top of the page.

Four conventional oil over gas accumulator springs 5, 6, 7, 8 are shown such that accumulator 5 is associated with the front left wheel and accumulator 8 with the rear left wheel, for example. The portion or chamber 5a, 6a, 7a, 8a of each of the accumulators are filled with gas, while the hydraulic oil filled portions 5b, 6b, 7b, 8b are in communication with the gas chambers 5a,6a,7a,8a. The oil and gas chambers are normally separated with a flexible diaphragm or free piston. Damper valves 5c, 6c, 7c, 8c are conveniently located in the mouths of the accumulators 5, 6, 7, 8.

When double acting wheel rams are used, they are normally conventionally divided into two reciprocal chambers including a larger chamber 1a, 2a, 3a, 4a, and a smaller chamber 1b, 2b, 3b, 4b, the smaller chamber accommodating a piston rod.

The upper larger chamber 1a is connected to the lower smaller chamber 3b of the diagonally opposite wheel by way of pipe or conduit 9 while the upper chamber 3a of this wheel, is connected to the lower chamber 1b of the first cylinder by way of pipe 10. These pipes therefore complete a pair of fluid circuits interconnecting one pair of diagonally opposite wheels, top to bottom chamber and visa versa. The other pair of diagonally opposite wheels are similarly interconnected 2a to 4b via conduit 11 and 4a to 2b via conduit 12.

Located (centrally) in any convenient place and in any suitable manner there is a component which can be referred to as the load distribution unit 13.

An earlier version of a load distribution unit is described in the Applicants' earlier patent WO 93/01948 and is normally constructed out of cylindrical tube divided by a fixed wall and having a movable piston in each chamber.

The two pistons in the former proposed construction were directly connected by a rod extending through the entire length of the cylinder so that both pistons were caused to move together in unison resulting in two of the chambers becoming enlarged simultaneously while the other two were being caused to contract reciprocally at the same time. This design has been found to lead to some inherent problems in certain circumstances described as follows.

In the previously disclosed construction, the piston, and rod assembly is unable to move in response to two orthogonal wheel inputs (such as movements over parallel speed humps). The chambers of the load distribution unit were described as being hydraulically connected to the wheels in a sequence such that the fluid pressure and volume changes resulting from two wheel orthogonal inputs oppose each other in order to prevent piston movements within the load distribution unit. The original proposed system was designed specifically to only permit piston and rod movements in the load distribution unit as a response to diagonal axle articulations which induce fluid pressure and volume changes in the load distribution unit to ensure optimal weight was being born by each of the four wheels without regard to their wheel travel positions.

As a consequence of the restriction of movement of the piston and rod assembly in response to two orthogonal wheel inputs suspension, pitching motion becomes noticeable in specific situations.

When, for example, the front pair of wheels encounters an obstacle, such as a speed hump across the width of the road, the fluid is firstly expelled from the top chambers of both the front rams, and some of this fluid is forced to enter the associated accumulators via damper valves. Generally the greater the resistance offered by these damper valves the greater the volume of fluid there will be forced to other parts of the connected hydraulic system, and inevitably some fluid enters the diagonally opposite lower chambers.

The transfer of fluid volume from the front rams into the lower chambers of the rear rams forces the associated pistons upwards thereby contracting the two rear rams, which in turn-tends to cause the rear of the vehicle to squat. The delay in this procedure at some frequencies can cause the rear of the vehicle to still be moving downwards or squatting when the rear pair of wheels encounter the same speed hump and this can lead to a rapid pitching response as a very rapid change in direction is required at the rear of the vehicle. The additional impact on the wheels of the rear axle also then further contracts the rear rams and this additionally compresses the gas in the associated accumulators.

As the rear wheels depart from the downside of the speed hump the cumulative compression of the gas in the rear accumulator gas chamber caused by the quick succession of front and rear wheel inputs is permitted to expand and thereby expels fluid from the rear accumulator fluid chambers. This can then cause the rear rams to overextend causing the rear of the vehicle to lift beyond the level which is required to re-establish normal ride height. If more humps in the road are then encountered by the front wheels before the vehicle has settled, a resonant response can be set up and can become exaggerated as rapid reversals in vehicle motion take place.

These motions can be at least partially negated by the dampers in the mouths of the accumulators as well as the restrictors located in the conduits. Nevertheless, various permutations of uncomfortable responses to poor road surfaces can occur depending on wheel base length, distance between bumps, speed, damping rates, spring rates and physical location of the rams with regard to the wheel geometry, for example.

The load distribution unit 13 according to the present invention provides resilience to lessen/suppress high frequency small amplitude inputs, and also provides some additional resilience in either pitch or roll motion specifically. The load distribution unit 13 has similarities in construction to the above described unit in that there are provided four chambers. However the one piece piston rod referred to in the prior specifiction is replaced with two piston rods with a resilient buffer interconnecting the two piston rods. FIGS. 1 to 11 show various alternative constructions of the load distribution unit 13 which are all generally divided into two cylinder portions 13a, 13b each of which comprise two reciprocal volume chambers, 14, 15, 16, 17. The same reference numerals are used in each of the Figures for corresponding components.

Figure 2:
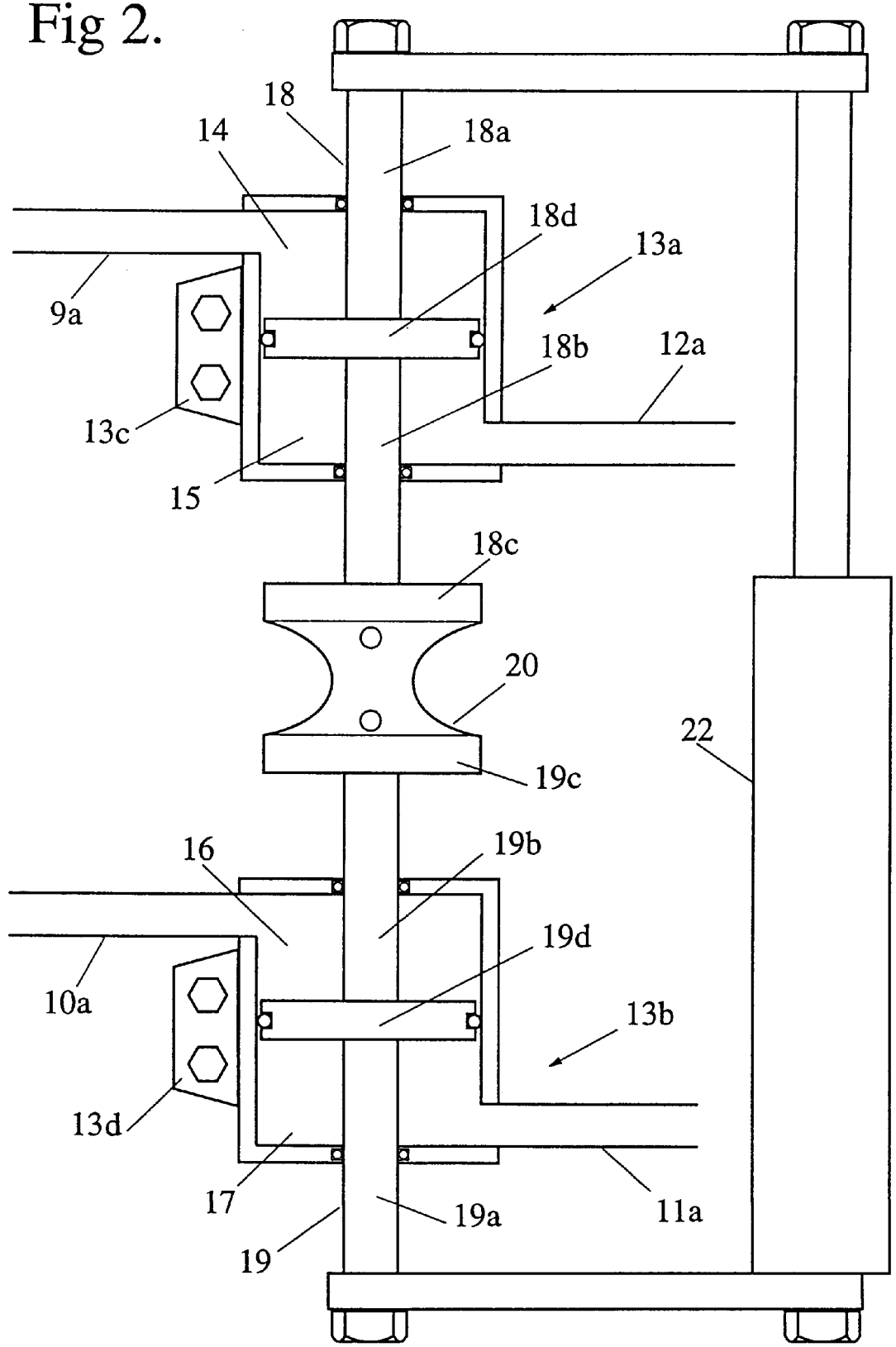
FIG. 2 is an enlarged diagrammatic view of the load distribution unit as incorporated in the suspension system shown in FIG. 1.

In FIG. 1 and 2, the load distribution unit 13 is shown with four main chambers 14, 15, 16, 17 respectively in direct fluid communication with branch lines 9a, 12a, 10a, 11a respectively and these are in fluid communication with ram chambers 1a, 3b, and 4a, 2b, and 3a, 1b, and 2a, 4b respectively via conduits 9, 12, 10, 11.

Chambers 14 and 15 within one cylinder portion 13a act reciprocally therein, as do chambers 16 and 17 in the other cylinder portion 13b. Each cylinder portion 13a, 13b supports a piston assembly 18,19, each piston assembly having a piston 18d,19d, an outer piston rod portion 18a, 19a and an inner piston rod portion 18b, 19b. The two outer piston rod portions 18a, 19a normally terminate outside the chambers at both ends of each of the cylinders to enable the pistons to move freely with respect to the cylinders.

The ends of the inner piston rod portions 18b, 19b which typically face each other may be provided with any convenient attachment means such as the disc fittings shown at the rod ends numbered 18c and 19c.

Between the opposed piston rod assemblies, a resilient member or buffer 20 is introduced to provide resilience in either compression or tension or both. In the example shown in FIG. 2, the resilient member 20 may comprise a rubberised portion which is joined or bonded to the discs 18c and 19c in FIG. 2.

Any movement therefore induced by fluid pressure and volume changes in one pair of reciprocal chambers (such as chambers 14, 15 in cylinder portion 13a) is indirectly transferred via the rod 18 and through the resilient member 20 into the other cylinder portion 13b of the load distribution unit 13 via rod 19 and thereby into the other pair of chambers 16, 17. The purpose of this indirect connection/coupling between the two cylinder portions may be described as follows:

It will be seen in FIG. 1 (in conjunction with FIG. 2) that the upper chambers 1a, 2a of the rams associated with the front wheels are in fluid communication with chambers 14 and 17 within the opposed cylinder portions of the load equalisation unit 13. If an obstacle (such as a speed hump) is encountered by both front wheels simultaneously, fluid will become expelled out of the upper chambers 1a and 2a.

Some fluid will initially enter the nearest accumulators 5 and 6 through damper valves 5c and 6c and some may be distributed to the rear ram and the control unit. Some fluid under increased pressure will therefore enter the branch lines 9a and 11a associated with the top front chambers of the rams 1 and 2. This fluid then enters chambers 14 and 17 at the opposite ends of the distribution unit and urge these chambers to enlarge. As they enlarge in volume the two piston and rod assemblies 18, 19 are forced to slide towards each other and this compresses the resilient member 20 which is located between the two cylinder portions 13a and 13b As the two piston assemblies 18, 19 are forced to move towards one another the chambers 15, 16 (which are reciprocal with chambers 18, 19 respectively) become progressively diminished in size and expel fluid down branch lines 12a, and 10a, into conduits 12 and 10 and thereby introduce fluid at a slightly greater pressure into cylinder chambers 2b, 4a, and 1b, 3a. This has the effect of further softening the impact of the speed bump on the front axle by pushing up the pistons within rams 1, and 2, and more importantly it provides fluid to the top chambers 3a, 4a of the back rams which tends to raise the rear of the vehicle up as the rams are extended in preparation for the rear wheels impacting the same speed humps.

It should therefore be noted that the resilient member 20 thereby largely reverses the adverse pitch response in the longitudinal plane of the vehicle relative to the prior proposed construction and this then softens the pitch harshness and helps to stabilise resonant pitching motions.

It should also be understood that while the configuration described with reference to FIGS. 1 and 2 modifies and softens pitch motions it does not effect roll stiffness. However, if it was required that roll stiffness was to be reduced instead of pitch stiffness the branch line conduits need only be exchanged to connect to the appropriate different chambers on the load distribution unit.

A further benefit of introducing a resilient member 20 into the load distribution unit is that the vehicle's general softness and comfort can be enhanced by the introduction of the resilient member 20 without sacrificing roll stability. It is also possible to reduce the amount of gas in the accumulators below what would normally be required so that the reduction in gas volume adds roll stiffness without adversely effecting comfort levels. Additionally roll stability does not reduce as more weight is loaded onto the vehicle as the gas in the accumulators becomes more compressed which effectively reduces roll.

The introduction of a resilient member such as the rubber component 20, however, can provide some dynamic isolation between wheels when faster small axle articulation movements are occurring. As large axle articulation movements occur only when driving at very slow speeds such as when operating off road, the consequence is there are few pressure spikes energising the resilient member 20 which causes dynamic isolation, and therefore, during slow articulations such dynamic isolation is not noticeable.

The softness of the resilient member 20 should be such that the two piston assemblies 18, 19 should substantially follow each other (or push and pull one another without there being much movement difference or loss between the two piston assemblies 18, 19) when there are single or slow diagonally opposed wheel inputs occurring such as when axle articulation is taking place, but the resilient member should not be so hard that when two wheels on the same axle encounter a sudden bump or depression simultaneously that the resilient member is not readily deformed to enable a delayed response in adverse pitch motions.

In practice, pressure spikes are significantly greater during two wheel high speed inputs than during slow speed articulation when some stiffness is required so there is some latitude with the choice of resilient means 20. In this context, the resilient member can optionally be replaced with any suitable damping mechanism which can similarly delay the transfer of force and movement from one shaft to the other without there being a resilient member such as a spring between the shafts.

In the FIGS. 3 to 7, the resilient means are illustrated in different forms, such as rubber or urethane blocks, coil springs, or gas accumulator types. It should be understood that within the scope of this invention that disc springs and other resilient means may equally be used and the spring mechanisms only serve to return the component parts to their correct relative positions.

In this regard the two cylinder portions 13a, 13b of the load distribution unit 13 are understood to be mechanically attached to one another so that the relative motions of their piston assemblies 18 and 19 do not cause their housing cylinders to also move. The attachment cleats numbered 21a, 21b, 13c, 13d therefore illustrate attachment means to the chassis (or any convenient member) of the two cylinder portions 13a, and 13b respectively.

The resilient means 20 is normally either held in compression or tension depending on which fluid conduits are connected to which chambers in relation to which end (or side) of the vehicle is heaviest at any given time and also with regard to the relative sizes of the rams 1, 2, 3, 4 bores and rods which define the relative system pressures. It is therefore necessary to design all components relatively so that the resilient member 20 is given the appropriate spring rate or hardness/durometer rating to compensate for any bias and/or expected weight variations.

It should be noted that as the resilient member 20 is frequently a spring of some nature it can become beneficial to introduce a damping component into the load distribution unit to damp out any unwanted spring resonance within this unit. The damping means may be designed into the load distribution unit as an integral part within the body of the unit. Alternatively the two ends of a damper (such as the telescopic shock absorber numbered 22 in FIG. 2) may be attached to the two rod ends (as at 18a and 19a) so that the damper is extended and contracted in direct response to any movement induced by two orthogonal wheel inputs but not by diagonal two wheel inputs such as when articulation is occurring. This further ensures that damping occurs specifically and only when needed and that the frictional resistance is minimised by the damper during axle articulation. This is important so that optimal even ground pressure occurs at the wheels during axle articulation while additional damping occurs when wheels impact parallel obstacles with successive axles.

The damper unit should be regarded as an important optional component as it permits the tuning of specific functions in the suspension system. The damper also can be used to delay the responses and interactions between the front and back axle so that inputs at sensitive frequencies resulting from wheel base length road conditions do not upset vehicles smooth passage. Dampers may also take the form of (optionally variable) restrictors 9b, 9c, 12b, 12c, 11b, 11c, 10b, 10c within the conduits, which permit the individual tuning of the various components. For example, when the restrictor-dampers 9b, 10b, 11b, 12b are introduced, fluid is restricted from communicating with the lower chambers 1b, 2b, 3b, 4b so that the resilient effects of the load distribution unit 13 are maximised. Conversely, when the dampers 9c, 10c, 11c, 12c are mainly used this prevents the free communication of fluid from the rams to the load distribution unit and encourages fluid to act upon the lower ram chambers 1b, 2b, 3b, 4b with very different consequences. Adjusting the balance of the restrictions exerted by restrictors 9b, 10b, 11b, 12b with reference to restrictors 9c, 10c, 11c, 12c provides the ability to allow for the appropriate tuning of the total damping forces acting on the vehicle. Such tuning can also be accomplished through the careful selection of conduit sizes to provide the appropriate amount of friction to arrive at similar damping responses.

Figure 3:
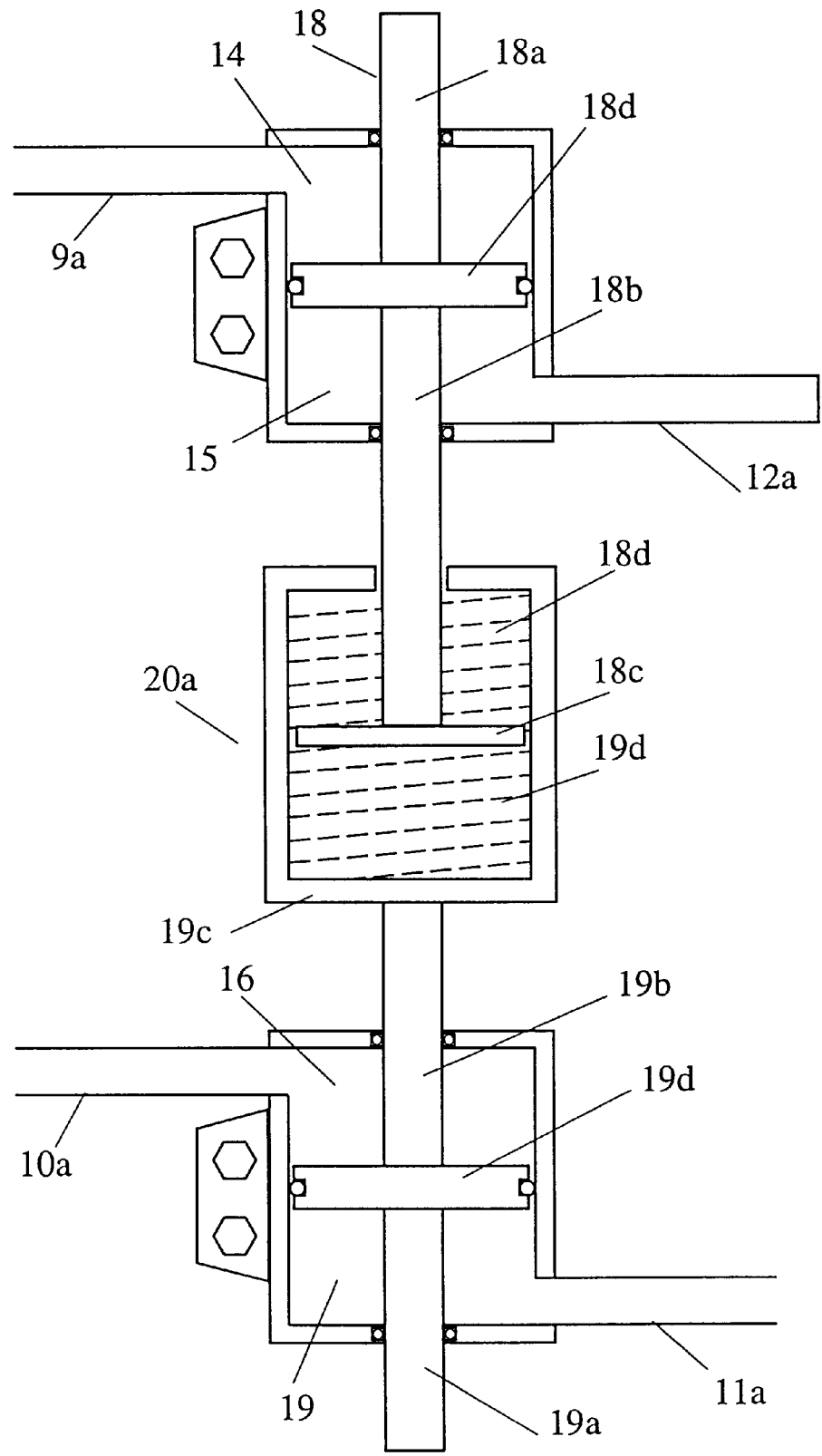

FIG. 3 is another alternative method of construction of the load distribution unit 13. In this embodiment the two cylinder portions 13a, 13b are remotely coupled by the resilient means 20a, which may comprise a cylindrical portion 19c fixed to rod portion 19b in the place of flange 19c in FIG. 2. At the end of the cylindrical portion facing the other rod there is a hole which can easily accommodate the opposed rod portion 18b.

The end of the opposite rod portion 18b extends through the hole in cylinder 19c so that a flange 18c provided on the end of the rod portion 18b is located inside the chamber and towards the centre of the cylinder 19c. On either side of the flange 18c there is provided a resilient means such as a coil or disc spring or rubber block numbered 18e, 19e. Alternatively the chambers on either side of the flange or piston 18c may be charged with gas to provide a gas spring to remotely locate the piston 18c within cylinder 19d.

One advantage of the resilient means such as 20a over 20 is that the two resilient members may be individually constructed differently to best suit their required functions as tension or compression members with reference to the other parts of the suspension system.

Resilient member 20a may alternatively be constructed by using a shock absorber (damper unit) provided with one or two concentric coil springs internally or externally of the telescopic component.

Figure 4:
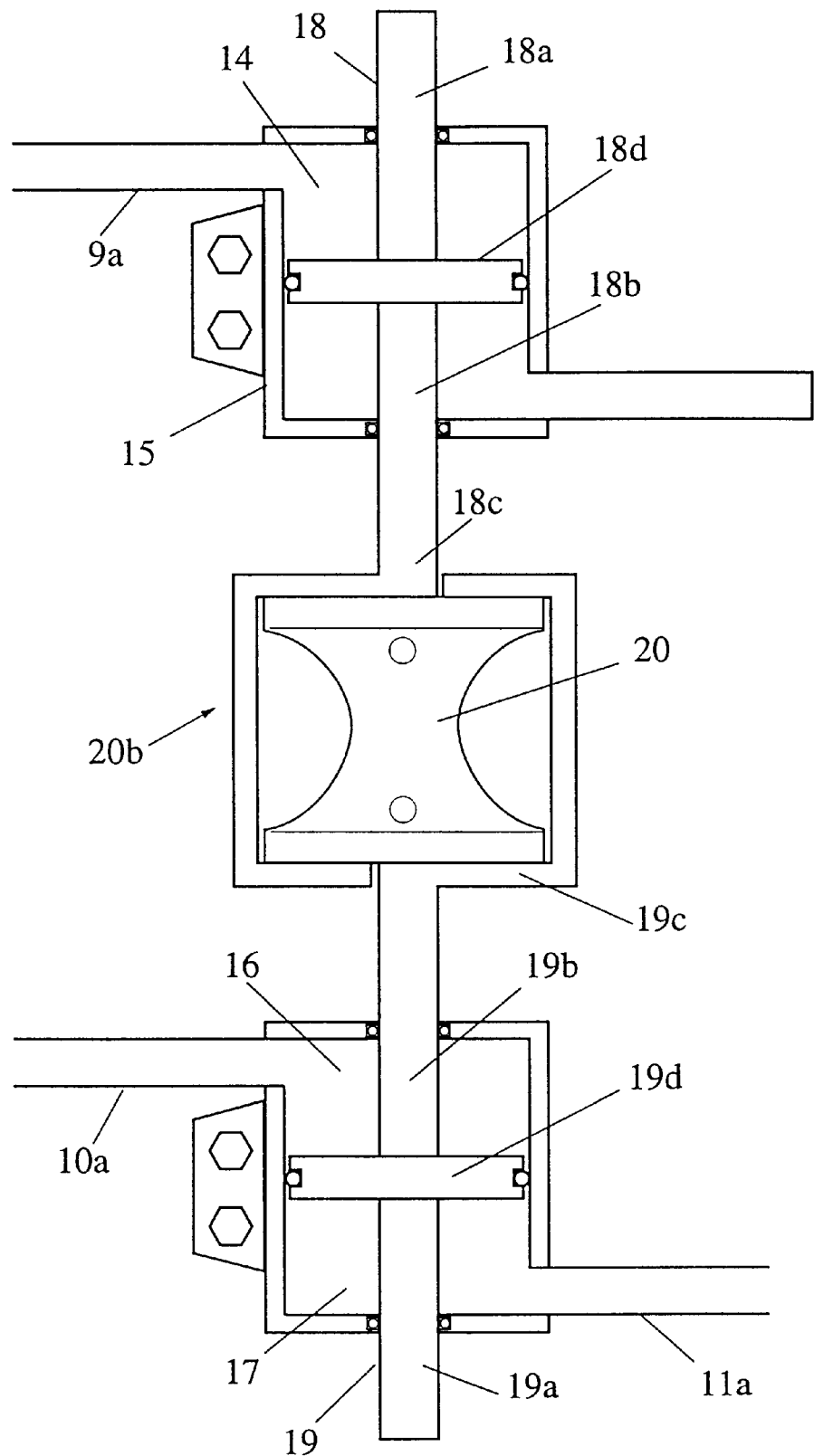

FIG. 4 shows another alternative to the central resilient member of FIG. 2. This version differs from that shown in FIG. 2 in that the resilient member 20 is kept in compression within half cylinders 18c, 19c regardless of whether the two half cylinders 18c and 19c are moving away from one another or towards each other. By keeping the resilient means in compression, the mechanical problems of bonding the rubber blocks to the end flanges 18c, and 19c of the embodiment of FIG. 2 are obviated.

Figure 5:
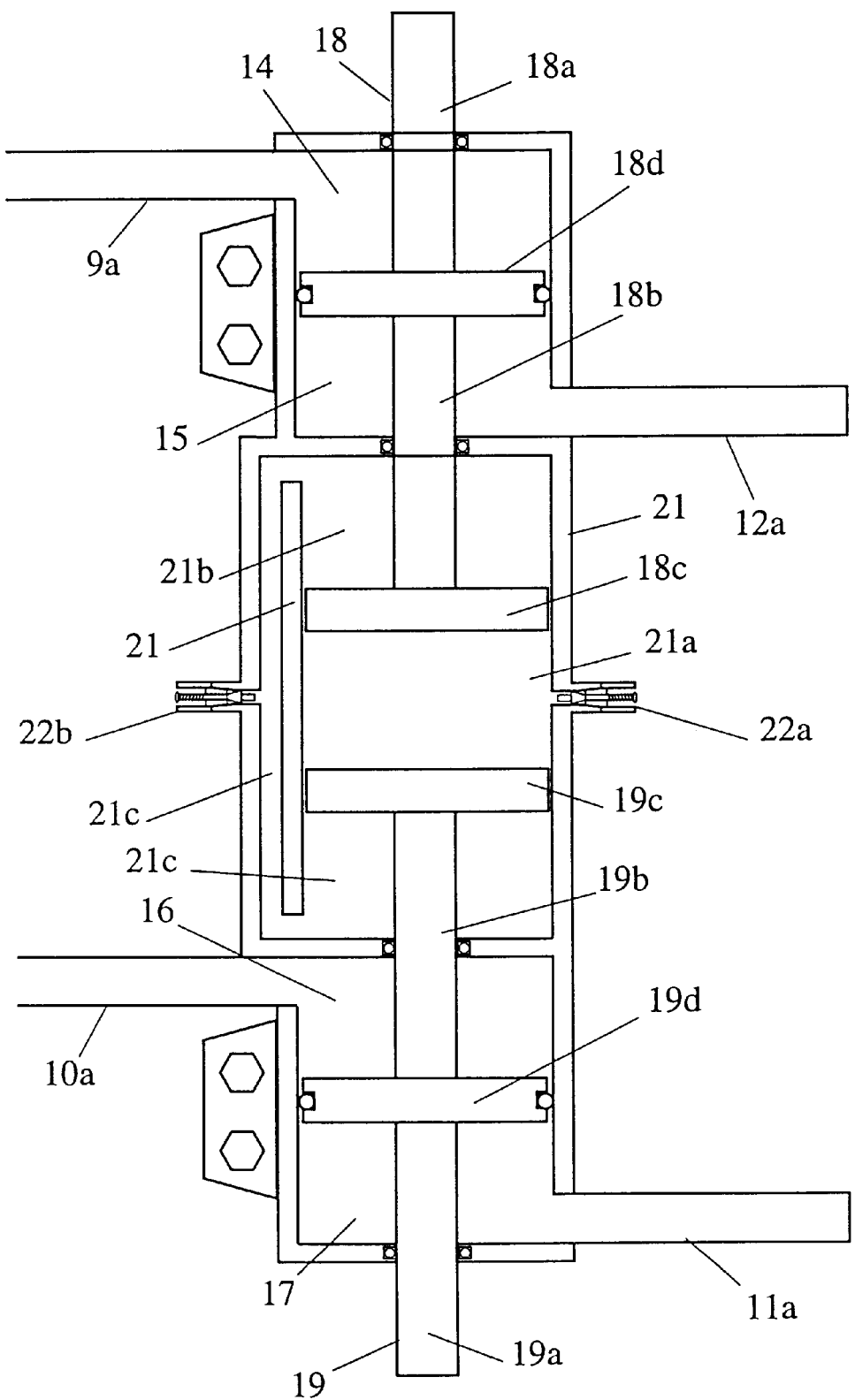

In FIG. 5, a gas charged version of the resilient member is illustrated. In essence the two rod ends 18c, 19c are constructed as pistons bearing seals within the cylindrical chamber 21 which is an extension of the cylinder portions 13a, 13b. The two pistons subdivide the cylinder 21 into three minor chambers 21a, 21b, and 21c as shown.

Chambers 21b and 21c, on either side of the central chamber 21 a are interconnected by way of conduit 21c so that these two chambers remain substantially at the same pressure whilst still remaining reciprocal in volume. The purpose of this is to prevent a bias developing which would substantially centre pistons 18c, 19c thereby restricting axle articulation with even wheel loading.

Two gas charge valves 22a, 22b are provided so that one valve 22a enables chamber 21a to be charged to an appropriate pressure to resist the pressure differential caused by the front of the vehicles weight exceeding that of the back, and valve 22b enables chambers 21b and 21c to be jointly charged to provide resilience sufficient to maintain vehicle height when the vehicle may weigh more at the rear as during a pitch motion.

Figure 6:
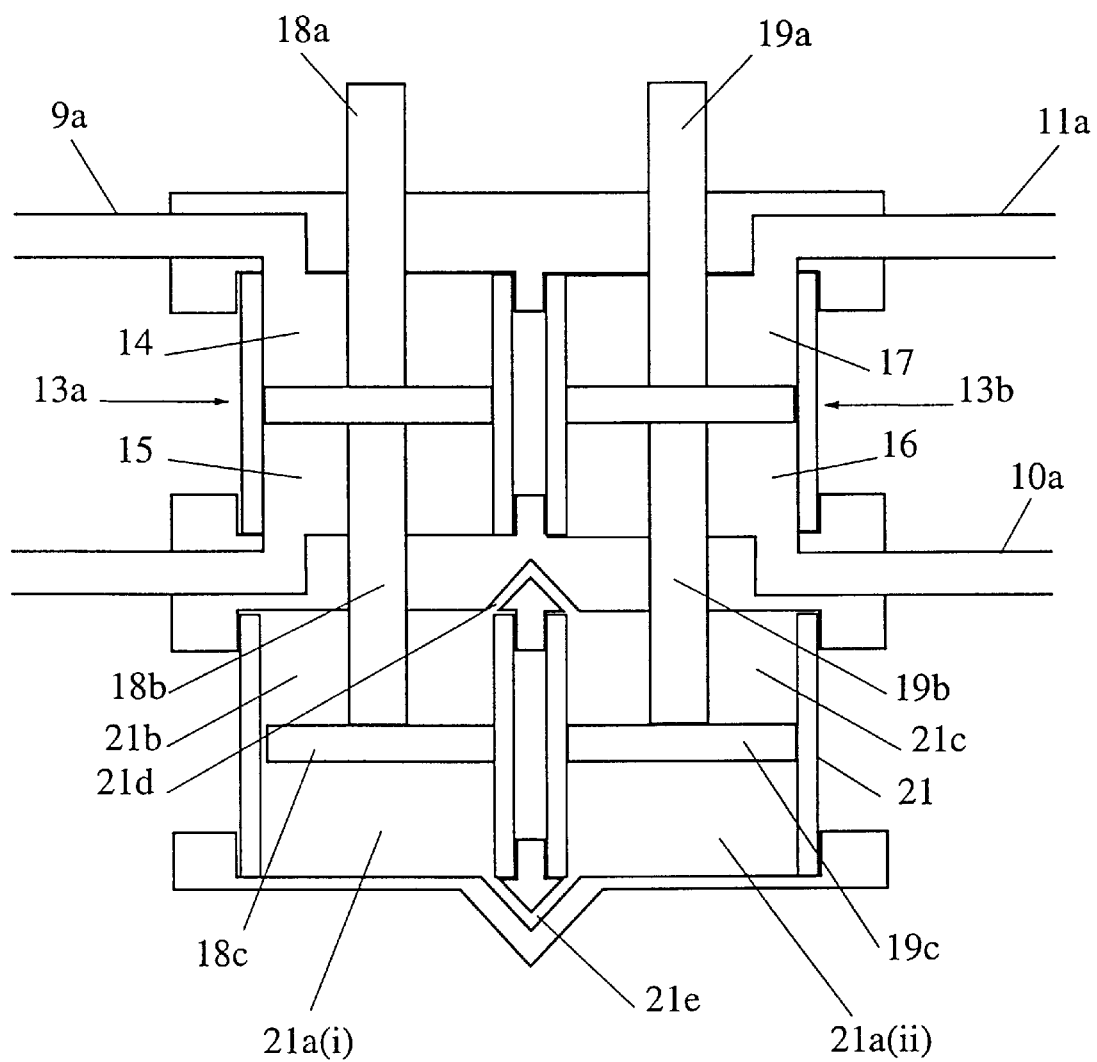
Figure 7:
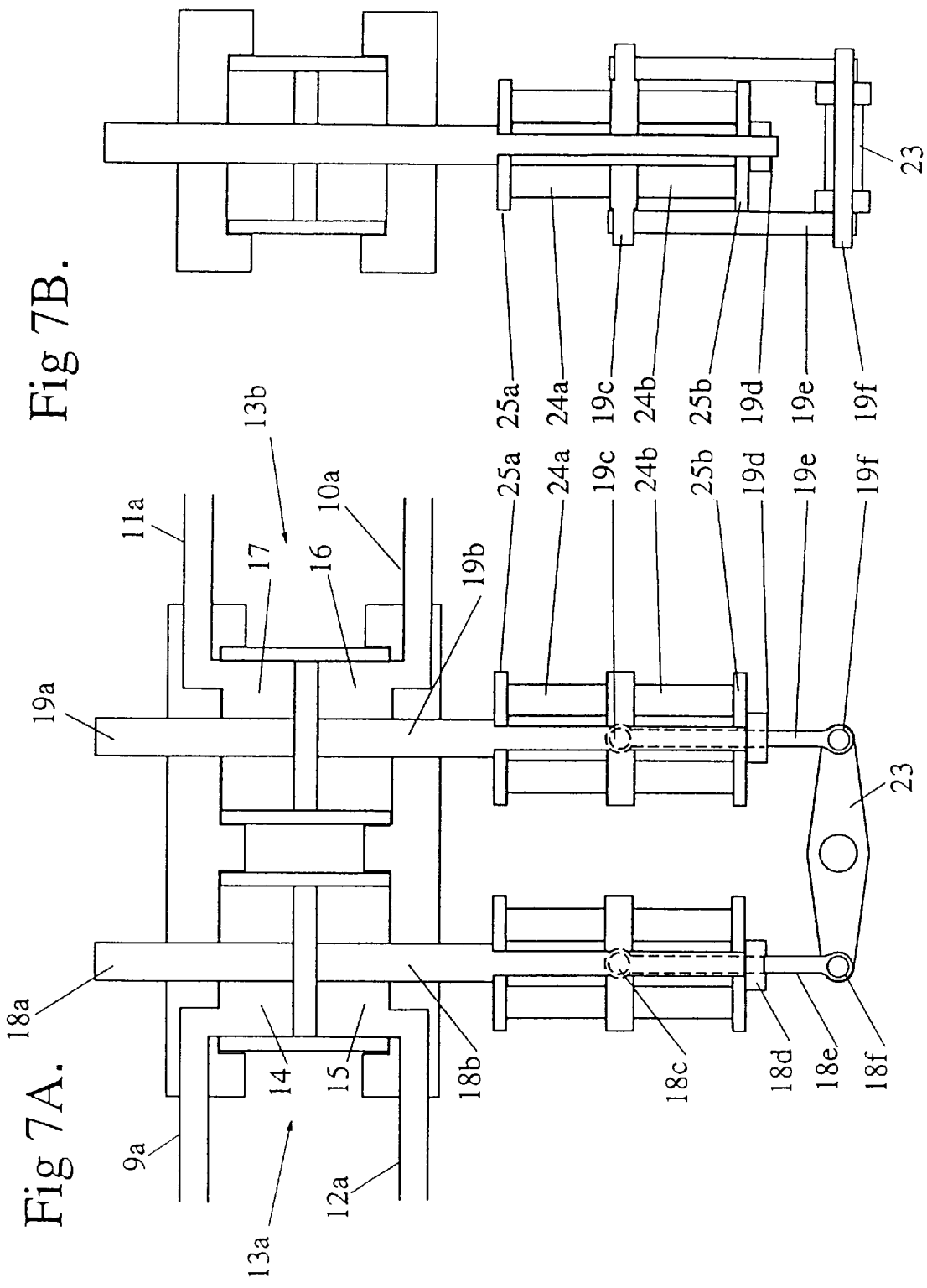

FIG. 6 is yet another version of the central resilient means and represents another gas charged form of the resilient means.

In this instance, the two cylinder portions 13a and 13b are located parallel so that their ends 18c and 19c do not face each other but face in the same direction. The central cylindrical chamber 21 is divided so that one half is located adjacent one cylinder portion 13a and accommodates piston 18c, and the other half of cylinder 21 located adjacent the other cylinder portion 13b and accommodates piston 19c.

Chambers 21b and 21c are linked by conduit 21d as in FIG. 6 so that they maintain a substantially equivalent pressure. As chamber 21a is now divided into two sections 21a(i) and 21a(ii) these are now similarly linked by way of conduit 21e.

In function, the version shown in FIG. 6 is the same as that shown in FIG. 5 but the advantage of the version in FIG. 6 is that the overall length of the load distribution unit 13 is reduced which facilitates packaging.

FIGS. 7a and 7b shows another version of the load distribution unit in which the two cylinder portions 13a and 13b are located in parallel. In this version however, the resilient gas spring chambers are replaced with rubber blocks or coil springs in the following way;

FIG. 7a represents a similar elevation view equivalent to that shown in FIG. 6. FIG. 7b is another elevation diagram drawn at right angles to the first and is included for clarity.

Inner piston rod portions 18b, 19b are elongated to extend to points 18d, 19d. At some point along the length of the extended rod portions there are points 18c, 19c which are equivalent in function to the parts numbered 18c and 19c in the other figures. In these FIGS., 18c and 19c may typically comprise a disc mounted and slidably located on the rods 18b and 19b. Protruding from each of these two discs on opposite sides there are two spigots or small rods which carry four arms 18e, 19e. These in turn are similarly flexibly joined at points 18f, 19f to a common rocker arm 23 which is pivotally mounted to the same member as that which locates the rest of the body of the load distribution unit 13. Disc and spigot units 18c and 19c are therefore mechanically and reciprocally mounted with respect to each other so that if one moves 'up' the other moves 'down'.

Resilient members 24a and 24b are functionally similar to the resilient means 18d 19d in FIG. 3 or the gas springs 21a (i) and (ii) and 21b and c, in FIG. 6, for example. In the example shown in FIG. 7 the resilient means 24a and b may be rubber or urethane blocks concentrically located around rods 18b and 19b and held between end stops marked 25a and 25b which are prevented from moving apart on the rods by any convenient means as shown.

If therefore, the vehicle wheels impact a speed hump with one axle, rod portions 18a and 19a will both be caused to be thrust downwards (with reference to the drawing) which would cause both sets of rubber blocks 24a to become compressed between discs 25a and 18c, 19c while the other rubber blocks 24b are permitted to extend. The impact of the two front wheels would therefore be borne to a degree by the blocks 24a and a similar impact on the two rear wheels simultaneous would cause the compression of the rubber blocks 24b to bear some of the impact.

If however the impact is solely on diagonally opposite wheels as during axle articulation, the four rubber blocks would remain substantially undistorted while one piston rod may be extending one way the other is contracting in the opposite direction. In this way, load distribution is optimally maintained during diagonal wheel movements while two orthogonal wheel inputs are partially resolved by the resilient means 24, and while roll forces on the other two orthogonally disposed wheels are resisted hydraulically.

Referring again to FIG. 1, at some point along the length of each conduit there may be optionally located a fixed or adjustable valve to vary the degree of resistance to the flow of fluid through the conduits. These valves are marked 9b, 10b, 11b, 12b and are normally located between the smaller cylinder chambers and the branch lines 9a, 10a, 11a, 12a, which in turn may have further restrictors 9c, 10c, 11c, 12c located along their lengths. Normally in operation these valves permit a large volume of fluid to flow at low speed (as during axle articulation), while the valves restrict the flow of smaller volumes of fluid at higher speeds which are typical of wheels impacting bumps at speed and which tend to upset the smooth running of the vehicle.

Additionally, it is found that for packaging reasons it is sometimes preferable to have as few accumulators in the wheel arch areas as possible and accordingly only one accumulator per hydraulic circuit is indicated although maximum comfort may be obtained by the inclusion of a second small accumulator located near the lower chambers 1b, 2b, 3b, 4b. Moreover, with reference to the type of layout shown in FIGS. 1 to 7 (which permit additional pitch resilience as a direct result of the design of the resilient means within the load equalisation units 13) it has been found that only a small gas volume is normally required in the accumulator associated with the lower chambers of the hydraulic cylinders.

Figure 8:
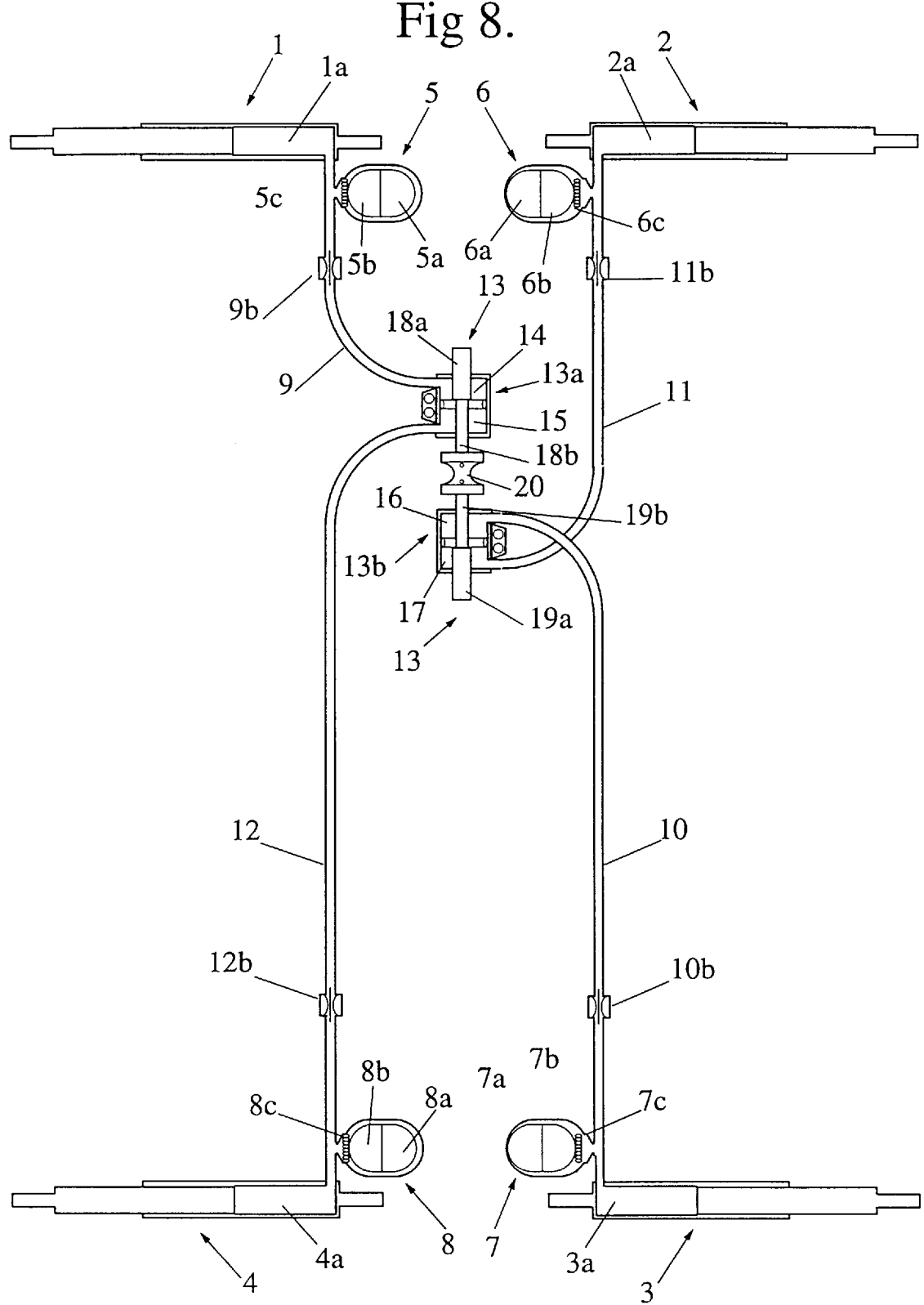
FIGS. 8 and 9 are diagrammatic representations of a vehicle with a version of the suspension system incorporating single acting hydraulic rams to support the vehicle body.

FIG. 8 of the drawings depicts the present invention applied to a vehicle wherein the hydraulic rams 1, 2, 3 and 4 are single acting rams in contrast to the double acting rams as described with reference to FIG. 1. As a result of the rams being only single acting, each of the conduits 9, 10, 11 and 12 only connect the respective upper chambers 1a, 3a, 2a and 4a of the rams with chambers 14, 16, 15 and 17 respectively of the load distribution unit 13. Thus, the portions of the conduits which communicated with the lower chambers 3b, 1b, 4b and 2b of the hydraulic rams can be eliminated.

Flow restrictors 9b, 10b, 11b and 12b positioned in the remaining portions of the conduits 9, 10, 11 and 12 may be desirable to allow further tuning of the suspension characteristics. Variable flow restrictors can be fitted to a 'semi-active' evolution of the system.

FIG. 8 also illustrates further modifications to the load distribution unit 13 which may optionally be included in the version shown in FIG. 1. In FIG. 8 the outer rod portions 18a and 19a are now of differing diameters to the inner rod portions 18b and 19b. This may be necessary to create differential areas from one side of the piston to the other in order to compensate for differential system pressures from front to rear due for example to uneven vehicle weight distribution. The outer rod portions could be larger or smaller in diameter compared to the inner rod portions depending on the direction of the bias, which in turn is dictated by the connection sequence of the conduits to the load distribution unit.

Figure 9:
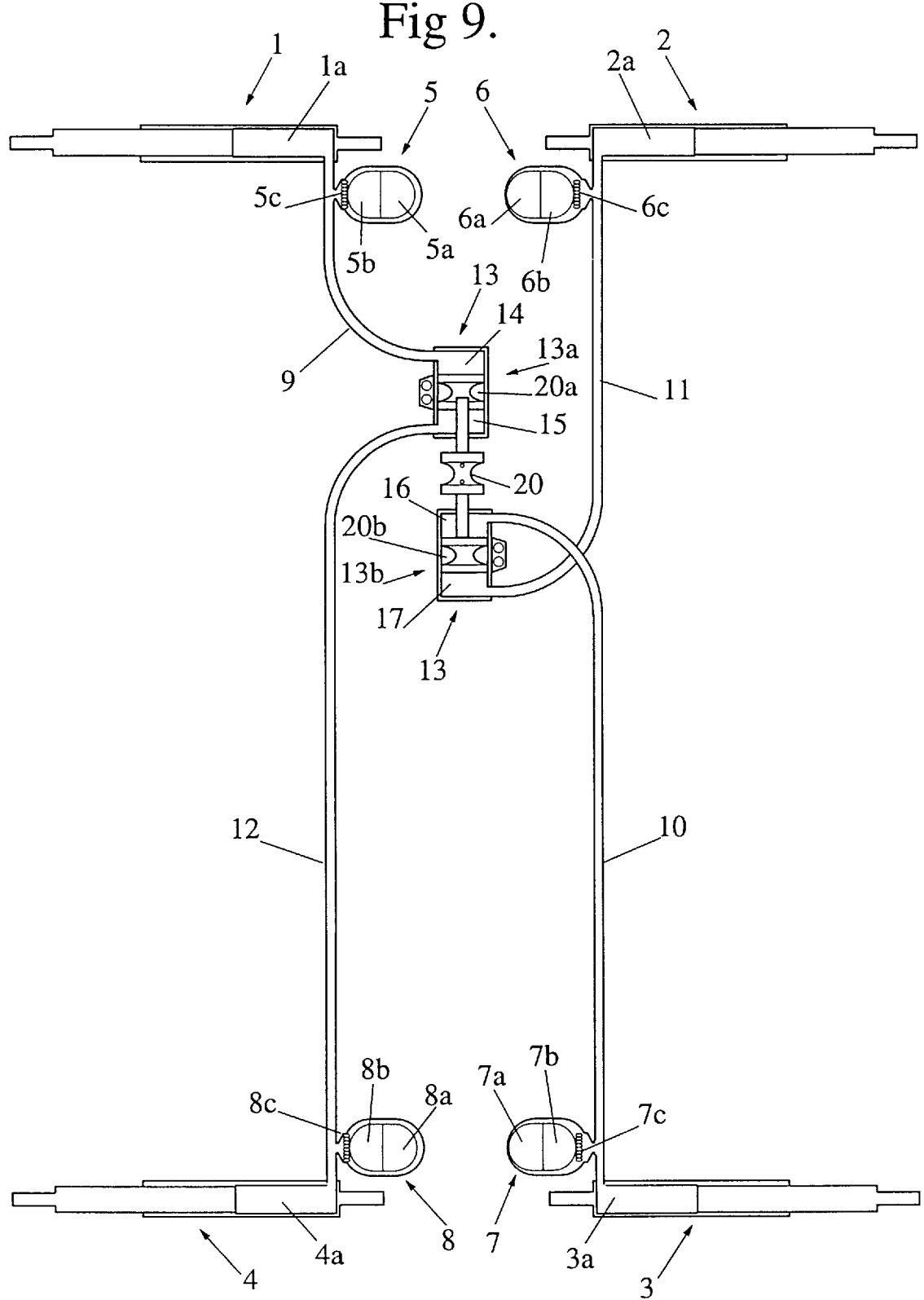

FIG. 9 shows the same circuit arrangement as depicted in FIG. 8 but with the modifications being restricted to the load distribution unit 13. Whereas in FIG. 8, outer rod portions 18a and 19a were of differing diameters to inner rod portions 18b and 19b, by the same reasoning the outer rod portions 18a and 19a could be omitted completely if desired. Depending on the weight distribution of a vehicle it may be necessary to change the sequence in which the conduits are connected to the load distribution unit as mentioned above.

In addition, the load distribution unit 13 as shown in FIGS. 1 and 2 has been modified in FIG. 9 by replacing the pistons 18 and 19 in FIG. 2 with a piston constructed in essentially the same way as resilient member 20 as seen in FIG. 2. Equivalents of the disk sections 18c and 19c sandwiching the resilient member 20 in FIG. 2 are constructed to function as pistons which reciprocate in the chambers 13a and 13b in the same basic manner as the single pistons as shown in FIGS. 1 and 2. However the use of this construction of the pistons, having the intermediate resilient section, results in some limited resilient movement between the two sections of the piston when one of the wheels is subjected to a sudden shock loading, in the same manner as the load distribution unit 20 does as previously described with reference to FIGS. 1 and 2. Movement during roll would also be induced resulting in a reduction in roll stiffness with the configuration shown in FIGS. 8 and 9.

Figure 10:
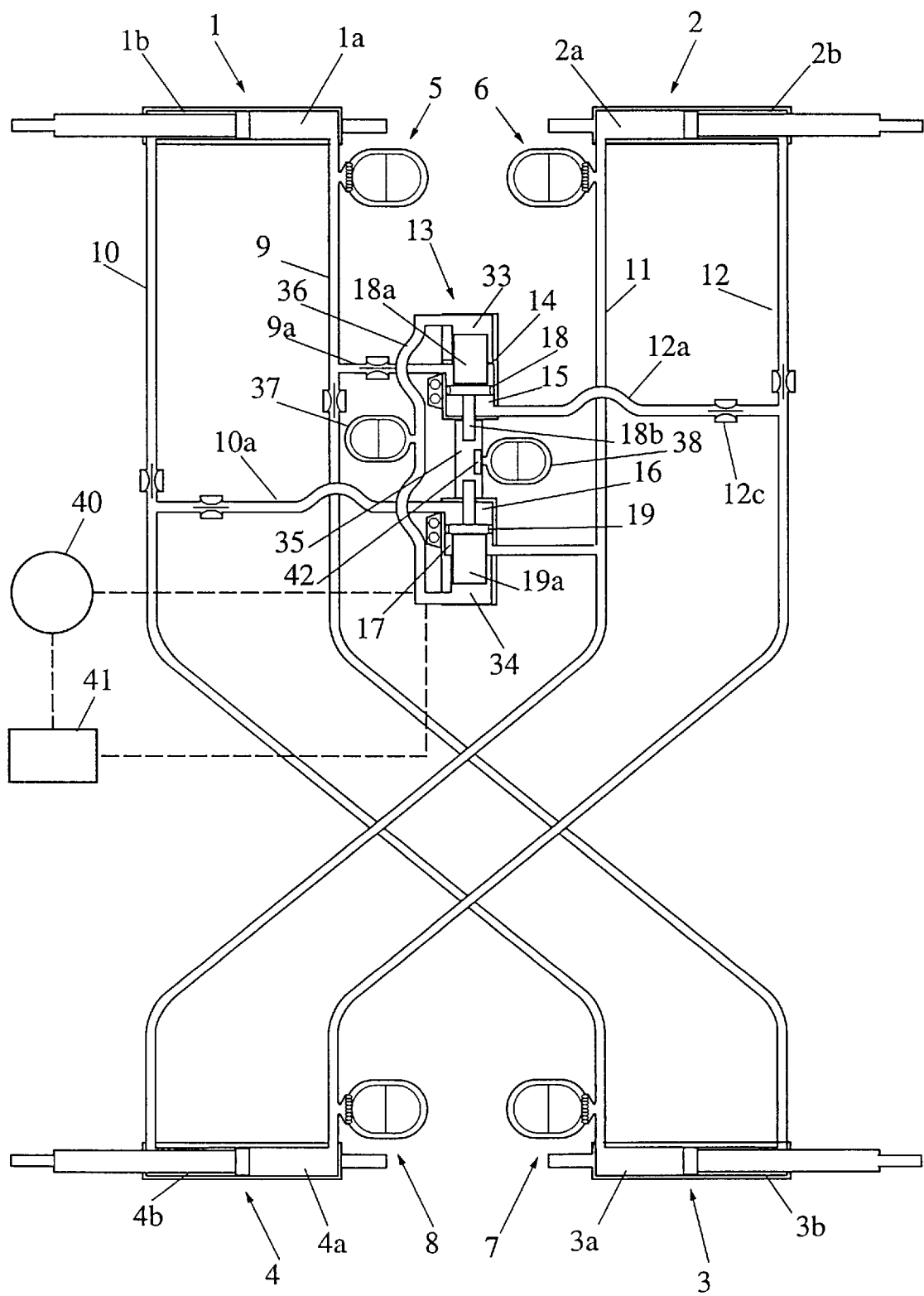
FIG. 10 is a diagrammatic representation of a suspension system incorporating a further alternative load distribution unit.

FIG. 10 shows a further preferred alternative form of the load distribution unit 13. In addition to chambers 14, 15, 16, 17 provided in the aforementioned forms of the distribution unit 13, the two piston assemblies 18, 19 are separated by a centre chamber 35 containing a compressible gas or a fluid. An accumulator 38 communicates with the centre cylinder 35 and movement of the piston assemblies 18, 19 towards each other will be resisted by the gas or fluid contained within the centre chamber 35. The outer rod portions 18a, 19a are larger in diameter than the inner rod portions 18b, 19b and are respectively accommodated within outer chambers 33, 34. These outer chambers are connected by a conduit 36, with a further accumulator 37 being provided on this conduit 36. Fluid is contained within the outer chambers 33, 34 and connecting conduit 36, and movement of the piston assemblies 18, 19 away from each other is resisted by the fluid contained therein.

This load distribution unit 13 has the ability to control pitch and accommodate large variations in vehicle load. For example, if a significant load is added to the rear of the vehicle, the piston assemblies 18, 19 of the load distribution unit 13 will be urged further apart due to the increased pressure and fluid volume in the inner chambers 15, 16 thereof. To compensate for the increased load from the inner chambers 15, 16, additional fluid may be introduced into outer chambers 33, 34 by a pump 40 or other means to increase the pressure acting on the ends of the outer rod portions 18a, 19a thereby allowing the pistons 18, 19 to return to their correct operating positions despite the increased load in the vehicle. Conversely, when the piston assemblies move too close together, it may be necessary to release fluid from the outer chambers 33, 34 to a tank 41 to compensate for removing load from the vehicle or for a load added to the front of the vehicle. Fluid may also be pumped or drained from the centre chamber 35 to control the position of the piston assemblies 18, 19. Returning the pistons 18,19 to their correct operating position allows greater clearance for movement of the piston assemblies to thereby prevent any restriction of the movement of the pistons 18,19 within their respective cylinder portions. Therefore, for a set pressure in the centre chamber 35 (ideally achieved through the use of a pressure regulator valve) the load distribution unit 13 may be controlled to compensate for changes in the load in the vehicle.

To control the necessary flow of fluid to and from the alternative load distribution unit 13, a load distribution unit position sensor (preferably a Hall Effect sensor) is required to enable the position of each piston 18, 19 to be ascertained. In order to achieve the correct positioning of said pistons, an electronic control unit averages the load distribution unit piston position sensor signals to attain the desired initial spacing between the pistons 18, 19 by supplying or releasing fluid from the outer chambers 33, 34.

Further details of this load distribution unit is disclosed in the Applicant's international application No. PCT/AU94/00646, and details are incorporated herein by reference.

As noted above, the suspension system according to the present invention tends to reduce pitch motions of a vehicle when going over speed humps or other obstacles. It is however preferable to maintain the height of the rear of the vehicle up until immediately before the rear wheels impact the speed hump and to retract the rear rams as the rear wheels travel over the hump. This helps to further reduce the pitch motion of the vehicle as it travels over humps or other obstacles.

To this end, a fast acting valve 42, such as a solenoid valve, is provided at the mouth of one or both the accumulators 37, 38 of the load distribution unit 13. This valve 42 can for example be provided at the mouth of the accumulator 38 of the centre chamber 35 as shown in FIG. 10. As gas or fluid enters the accumulator 38 when the front wheels hit a hump and fluid is expelled from the top chambers 1a, 2a of the front rams 1, 2 to the load distribution unit 13, the solenoid valve 42 can temporarily close off the accumulator 38 to therefore store the pressurised gas or fluid. An electronic control unit can determine when the rear wheels impact the hump and this has the effect of retracting the rear rams 3, 4 as the rear wheels travel over the hump so that the pitch motion of the vehicle is further reduces the input to the rear axle.

Figure 11:
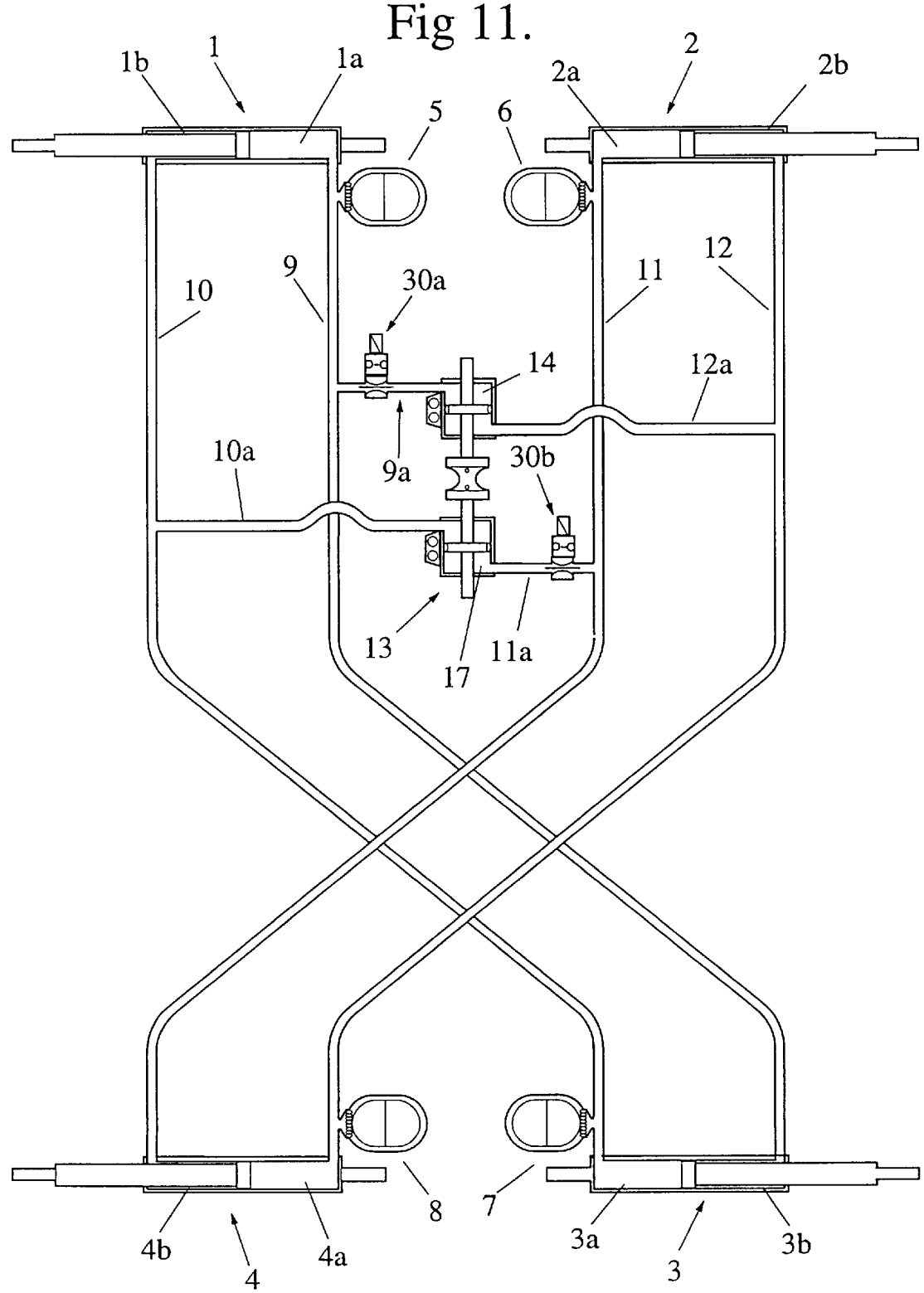
FIG. 11 is a suspension system as shown in FIG. 1 incorporating a load distribution lockout arrangement.

FIG. 11 shows the suspension system of FIG. 1 which has been modified to incorporate a "load distribution lockout" arrangement.

The Applicant's suspension system has the advantage in allowing large degrees of axle "articulation" without significantly affecting the normal reaction force at each vehicle wheel to the ground thereby maintaining a similar amount of traction over extremely rough ground as over flat ground. The term "articulation" refers to the movement of diagonally disposed wheels in a common direction. Furthermore, these systems oppose and thereby limit the body roll motions created when the vehicle is cornering without the need for roll stabiliser bars.

It has been found that in vehicles fitted with the above noted suspension system, during extreme situations, for example, when there is a combination of very fast cornering and hard braking or fast acceleration, this can result in the lightly loaded wheel of the vehicle lifting completely off the ground. While this does not necessarily effect the overall stability of the vehicle, the lifting of one of the vehicle wheels can be disconcerting.

The load distribution lockout arrangement includes at least one "lock-out" valve 30a, 30b provided on at least one of the branch conduits 9a, 10a, 11a, 12a. In the arrangement shown in FIG. 11, valves 30a, 30b are respectively provided in branch conduits 9a and 11a communicating with the outer chambers 14, 17 of the load distribution unit 13.

When the valves 30a, 30b are actuated to block the flow of fluid through the branch conduits, this acts to disable the suspension system so that articulation in the suspension system is restricted or prevented. This stops or minimises the lifting of the wheel under the above noted extreme driving conditions. These conditions can be sensed via a sensor means mounted on the vehicle, the sensor means for actuating the valves 30a, 30b.

The sensor means may include an acceleration sensor. Alternatively or in addition, the sensor means may include a vehicle speed sensor. The sensor means may provide a signal to the control means when both lateral and longitudinal accelerations of the vehicle in excess of programmable preset levels are detected simultaneously, the control means thereby actuating the locking means. The control means may only actuate the locking means when the signal from the vehicle speed sensor indicates the speed to be above a preset level. This prevents actuation of the locking means when the vehicle is traversing rough terrain.

It should be noted that the sensor means may comprise many different types of sensors as long as the control means is able to determine from the available inputs the appropriate reactions to the lateral and longitudinal accelerations acting on the vehicle. For example, the sensor means may alternatively consist of speed, steering angle, throttle position and brake pedal position sensors. By using resilient members 20 in place of pistons in the load distribution unit 13 as shown in FIG. 9, it is possible to eliminate the need for accumulators 5, 6, 7, 8 in the suspension system. This will generally be the case for any of the embodiments of the suspension system according to the present invention.

The load distribution unit according to the present invention provides the suspension system with additional resilience in the pitch direction of the vehicle while not increasing compliance of the vehicle in the roll direction. This has the advantage in that the front wheels are practically "decoupled" from the back wheels when the front wheels impact a speed hump or other obstacles so that the back wheels are not significantly influenced by the movement of the front wheels in this situation. This results in less harsh pitch motions of the vehicle and softer ride.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A suspension system for a vehicle, the vehicle having a body and at least one front and one rear pair of wheels, the body being supported above each wheel by a respective double acting ram, the double acting rams being interconnected between the wheel and the body;

each double acting ram comprising a cylinder bore separated into a first and a second fluid filled chamber by a piston, a cylinder rod being fixed to the piston and extending through one of the first or second fluid filled chambers;

each front wheel ram being connected to the diagonally opposite rear wheel ram by a respective pair of fluid communicating conduits, a first conduit of each said pair of fluid communicating conduits connecting the first chamber of the front wheel ram to the second chamber of the rear wheel ram, and a second conduit of each said pair of fluid communicating conduits connecting the second chamber of the front wheel ram to the first chamber of the rear wheel ram, each said pair of conduits and the front and rear wheel rams interconnected thereby constituting a respective circuit whereby first and second diagonal circuits are formed;

a pressure distribution means interposed between the first and second circuits and adapted to substantially achieve pressure equilibrium between said circuits, said pressure distribution means including two primary chambers, each primary chamber including two system chambers defined by respective movable walls, the two moveable walls being interconnected from one said primary chamber to the other said primary chamber by force transfer means;

wherein the force transfer means includes a resilient means to permit relative motion between the moveable walls and thereby provide additional pitch resilience in the suspension system.

2. A suspension system as claimed in claim 1, wherein the system chambers of one primary chamber are connected to the first chambers of the double acting rams on one side of the vehicle, the first chambers of the double acting rams on the opposite side of the vehicle being connected to the system chambers of the other primary chamber, such that roll motions of the vehicle are resisted by the pressure distribution means;

both of the first and second diagonal circuits being connected to the pressure distribution means such that the first conduit of each said diagonal circuit is connected to a said system chamber in one said primary chamber, the second conduit of said circuit being connected to a said system chamber in the other said primary chamber such that the pressure distribution means substantially achieves pressure equilibrium between said first and second diagonal circuits, thereby providing the suspension system with negligible resistance to cross-axle articulation motions; and the double-acting rams at one end of the vehicle are connected to the pressure distribution means such that the first chamber of the ram on one side of the vehicle is connected to a said system chamber in one said primary chamber and the first chamber of the ram on the other side of the vehicle is connected to an opposing said system chamber in the other primary chamber, such that the resilient means in the force transfer means provides additional pitch resilience in the suspension system.

3. A suspension system as claimed in claim 2, wherein the resilient means is effected by a resilient member.

4. A suspension system as claimed in claim 2, wherein the resilient means is effected by a compressible gas means.

5. A suspension system as claimed in claim 2, wherein said force transfer means includes respective piston rods projecting from each moveable wall, the rods at adjacent ends extending into a common chamber isolated from the primary chambers, said common chamber being charged with a fluid to apply equal force to the piston rod of each moveable wall.

6. A suspension system as claimed in claim 5 wherein an accumulator is in operable communication with said common chamber for fluid flow therebetween.

7. A suspension system as claimed in claim 6 wherein the operable communication is through a selectively variable flow rate passage.

8. A suspension system as claimed in claim 5, wherein said force transfer means includes further piston rods projecting from the moveable walls, and a respective third chamber in which each rod extends, said third chambers being respectively located on the opposite side of the primary chambers to the location of the common chamber, said third chambers being in operable communication for fluid flow therebetween.

9. A suspension system as claim in claim 8 wherein said operable communication includes an accumulator for fluid flow therebetween.

10. A suspension system as claimed in claim 8, wherein means are provided to selectively supply or withdraw fluid from said third chambers.

11. A suspension system as claimed in claim 10, wherein means are provided to selectively supply or withdraw fluid from said common chamber.

12. A suspension system as claimed in claim 8, wherein the diameter of said piston rods is different to the diameter of said further piston rods.

13. A suspension system as claimed in claim 5, wherein the fluid in the common chamber is a gas.

14. A suspension system as claimed in claim 5, wherein means are provided to selectively supply or withdraw fluid from said common chamber.

15. A suspension system, as claimed in claim 1, wherein means are provided to selectively isolate the pressure distribution means from at least one of said fluid communicating conduits of the diagonal circuits.

16. A suspension system as claimed in claim 1, wherein said force transfer means includes a respective rigid member projecting from each moveable wall into a further chamber and attached to respective control pistons therein, said control pistons defining within said further chamber a first control chamber between said two control pistons and on the opposite side of each control piston respective second control chambers, said first and said second control chambers each being charged with a fluid to normally centralize the pistons defining the system chambers and to permit controlled movement therebetween to thereby permit independent control of the pitch and roll of the vehicle.

17. A suspension system as claimed in claim 16, wherein the second control chambers are disposed in a side by side relation and said control pistons are each disposed in respective side by side chambers.

18. A suspension system as claimed in claim 16, wherein the fluid in the control chambers is a gas.

19. A suspension system as claimed in claim 1, including damping means for damping said relative motion between the moveable walls.

20. A suspension system for a vehicle, the vehicle having a body and at least one forward and one rear pair of wheels, the body being supported above each wheel by a respective double acting ram, the double acting rams being interconnected between the wheel and the body;

each double acting ram comprising a cylinder bore separated into a first and a second fluid filled chamber by a piston, a cylinder rod being fixed to the piston and extending through an end of the second fluid filled chambers;

each front wheel ram being connected to the diagonally opposite rear wheel ram by a respective pair of fluid communicating conduits, a first said conduit of each said pair of fluid communicating conduits connecting the first chamber of said front wheel ram to the second chamber of the rear wheel ram, and a second said conduit of each said pair of fluid communicating conduits connecting the second chamber of the front wheel ram to the first chamber of the rear wheel ram, each said pair of conduits and the front and rear wheels rams interconnected thereby constituting a respective circuit whereby first and second diagonal circuits are formed;

a pressure distribution means interposed between the first and second circuits and adapted to substantially achieve pressure equilibrium between said circuits, said pressure distribution means including two primary chambers, each primary chamber including first and second system chambers defined by respective moveable walls;

the first system chamber of the first primary chamber being in fluid communication with the first conduit of the second diagonal circuit, the first system chamber of the second primary chamber being in fluid communication with the first conduit of the first diagonal circuit, the second system chamber of the first primary chamber being in fluid communication with the second conduit of the first diagonal circuit and the second system chamber of the second primary chamber being in fluid communication with the second conduit of the second diagonal circuit;

the moveable walls within each primary chamber being functionally interconnected by a force transfer means incorporating a resilient means to permit resilient relative motion between the moveable walls and thereby provide additional pitch resilience when both said front or rear wheels are required to move simultaneously with additional freedom in the same direction relative to the vehicle body and without influencing roll or warp control.

* * * * *